April 8, 1958  G. F. WICHMANN ET AL  2,829,726
VALVE MEANS RESPONSIVE TO STEERING WHEEL MOVEMENT TO
CUT OFF FLUID SUPPLY TO HYDRAULIC STEERING SYSTEM
Filed Oct. 20, 1955  2 Sheets-Sheet 1

INVENTORS
GEORGE F. WICHMANN
BY HOMER A. GRAY

ATTORNEYS

April 8, 1958 G. F. WICHMANN ET AL 2,829,726
VALVE MEANS RESPONSIVE TO STEERING WHEEL MOVEMENT TO
CUT OFF FLUID SUPPLY TO HYDRAULIC STEERING SYSTEM
Filed Oct. 20, 1955 2 Sheets-Sheet 2
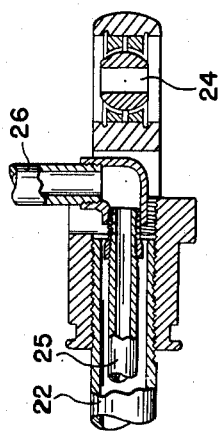
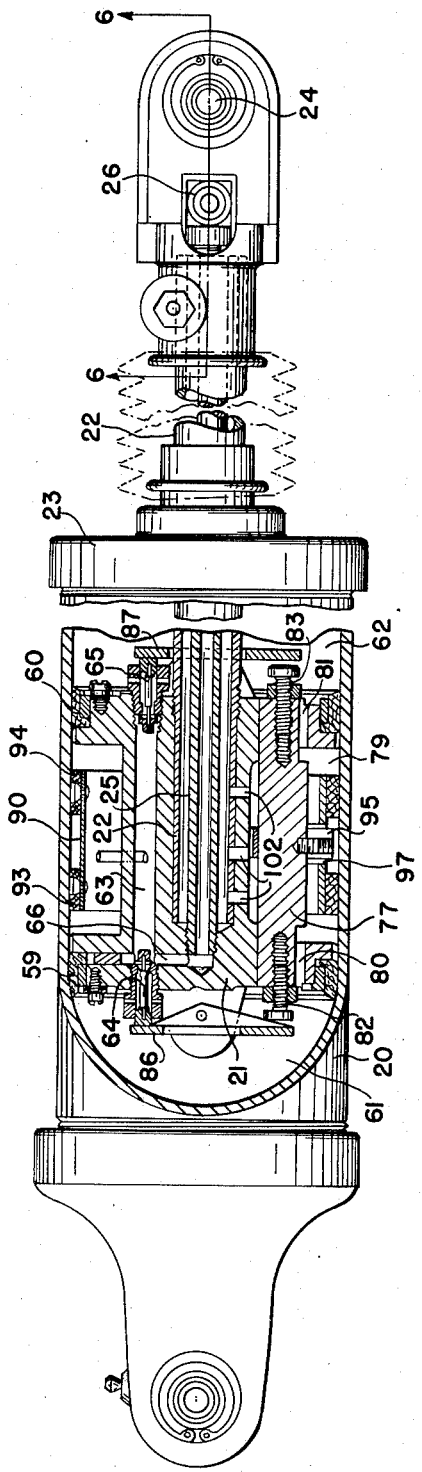
INVENTORS
GEORGE F. WICHMANN
BY HOMER A. GRAY
ATTORNEYS

United States Patent Office 2,829,726
Patented Apr. 8, 1958

2,829,726

VALVE MEANS RESPONSIVE TO STEERING WHEEL MOVEMENT TO CUT OFF FLUID SUPPLY TO HYDRAULIC STEERING SYSTEM

George F. Wichmann, Shaker Heights, and Homer A. Gray, Northfield, Ohio

Application October 20, 1955, Serial No. 541,810

2 Claims. (Cl. 180—79.2)

This invention relates to improvements in fluid operated boosters, particularly boosters for the steering mechanism of automotive vehicles. The power fluid used may be compressed air, vacuum or hydraulic. As illustrated herein the invention is applied to a compressed air system.

The mechanism for carrying out the invention turns on the flow of power fluid at the instant it is needed, continues the application of such power as long as a slight pressure on the steering wheel is maintained by the operator and interrupts the power application the instant the operator ceases turning the steering wheel. The immediate response to the operator's release of turning pressure makes the control quick and complete and prevents any further undesired momentary booster effect which might be dangerous to the occupants of the vehicle.

One of the objects of the invention therefore is the provision of a control for a fluid power steering system which shall be immediately responsive to the steering wheel movements and not over responsive.

Another object is the provision of a valve in the fluid supply line responsive to steering wheel movements to cut the power on and off instantly.

Another object is the provision of a solenoid valve for the power line, the circuit for which is controlled by the movements of the steering wheel to remain closed only so long as the operator maintains light steering pressure on the steering wheel in a given direction.

Still another object is the provision of an electric switch of novel construction for accomplishing the control of the booster.

Other objects and features of novelty will appear as we proceed with the description of that embodiment of the invention which, for the purposes of the present application, we have illustrated in the accompanying drawings, in which Fig. 1 is a schematic illustration of a vehicle equipped with the invention.

Fig. 5 is a plan view partly in axial section illustrating the piston construction of one form of booster unit which may be employed, and Fig. 6 is a detail view of the pressure fluid and exhaust connections for the unit of Fig. 5, the view being partially in section on the line 6—6 of Fig. 5.

Figure 1:
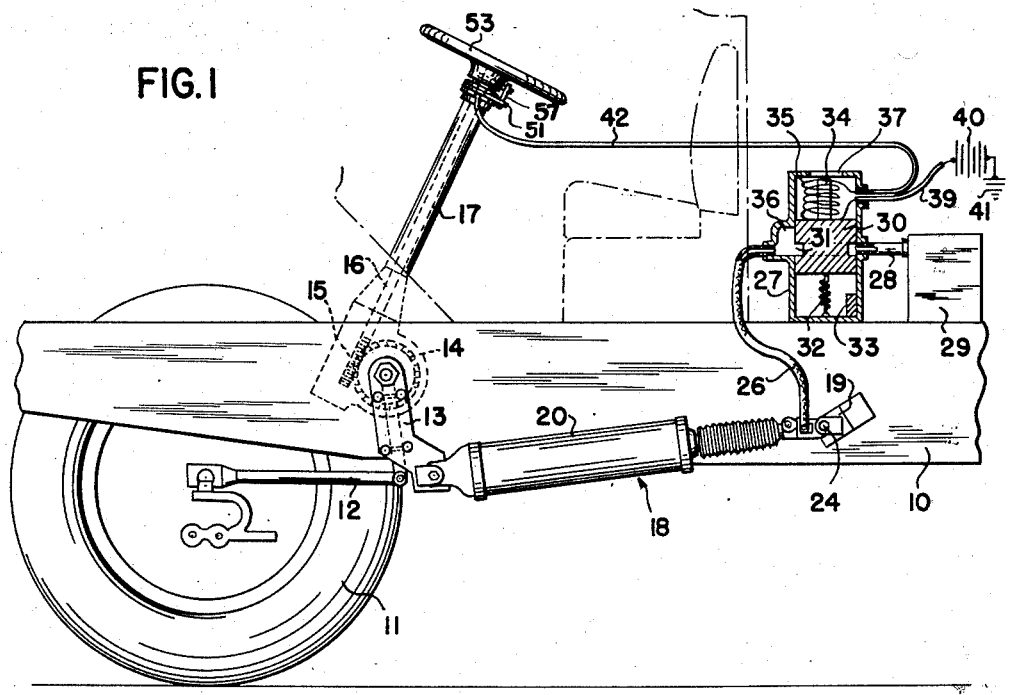
Figure 2:
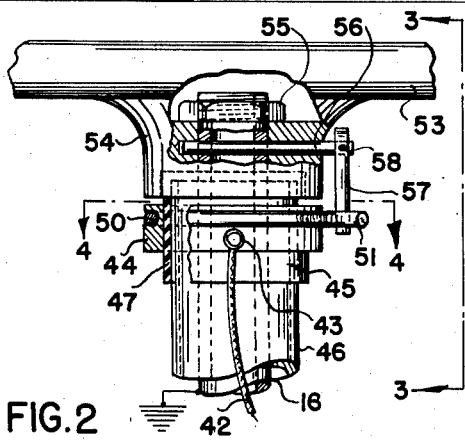
Fig. 2 is an enlarged elevational detail view of the upper end of the steering post and associated parts, the view being partly in section.
Figure 3:
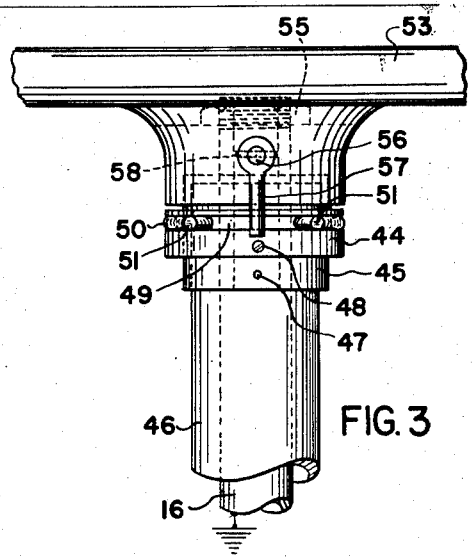
Fig. 3 is an elevational view similar to Fig. 2, but taken at right angles to Fig. 2 or in the direction of arrows 3 in that figure.
Figure 4:
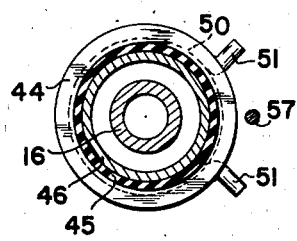
Fig. 4 is a cross-sectional view taken substantially on the line 4—4 of Fig. 2.

Referring to Fig. 1, the frame of a vehicle is shown at 10. The front ground wheels, one of which is illustrated at 11, are adapted to be turned by a steering link 12 pivotally connected with the lower end of a pitman 13 the upper end of which is secured to a worm wheel 14 that is operatively connected with a worm 15 on the lower end of a steering shaft 16 enclosed within a fixed steering post or column 17, all of these parts being conventional.

A booster unit 18 of any desired character is interposed between the lower end of pitman 13 and a bracket 19 bolted or otherwise fastened to the frame 10. This unit may comprise a cylinder 20 pivoted to the pitman 13. In the unit illustrated both ends of the cylinder are closed. A spool shaped piston 21 slides within the cylinder, being attached to a hollow piston rod 22 which slides through packing in the cylinder end wall 23. The outer end of this piston rod is pivotally mounted at 24 in the bracket 19. Within the hollow piston rod there is a tubular conductor 25 which is connected at its outer end to a flexible hose 26 that leads to one side wall of a valve casing 27. From an opposite wall of the casing, which is preferably cylindrical, a second conductor 28 leads to a source of air pressure illustrated as a tank or reservoir 29.

Within the valve casing 27 there is a piston 30 provided with an external groove 31 that is adapted to come into register with the two conductors 26 and 28. This piston is normally drawn down by spring 32 into contact with a stop 33, in which position it shuts off the conductor 28. Extending upwardly from the piston 30 there is an armature 34 of a solenoid having an electric coil 35. The solenoid when energized overcomes the action of spring 32 and raises piston 30 to the position illustrated. In this position pressure fluid is free to flow from source 29 through groove 31 and flexible hose 26 to the booster unit. Casing 27 has a chamber 36 on one side in communication at all times with the conductor 26. When the solenoid is deenergized and the piston is pulled down to close off the inlet conductor 28, chamber 36 communicates with the space above the piston and any pressure then in conductor 26 and the passages in the booster in communication therewith will immediately exhaust to atmosphere through the opening 37 in the top of the valve casing.

The solenoid valve construction just described is schematic and is used for illustration purposes merely. Three way valves for accomplishing the purpose are commercially available, and the valve per se forms no part of the present invention.

One end of the solenoid coil 35 is connected by an electric conductor 39 to a battery 40 which may be grounded at 41. The other end of the coil is connected by a conductor 42 with a binding post 43 on a metal ring 44 surrounding a sleeve 45 of insulation. Sleeve 45 is mounted upon the relatively fixed steering post 46 of the vehicle and may be secured against movement thereon by screws 47. Ring 44 is fastened to sleeve 45 by suitable means, such as screws 48. Ring 44 is therefore fixed.

In ring 44 there is formed an annular groove 49, the inner surface of which is curved to conform closely with the cross section of a split ring 50 which is mounted within the groove. Ring 50 is made of spring wire and fits groove 49 closely. It may be turned in the groove but the frictional contact between the ring 50 and the ring 44 is sufficient to maintain good electrical contact therebetween. The spaced ends of split ring 50 are bent outwardly at 51 in approximately radial directions.

The steering wheel 53 has a hub 54 through which the steering shaft 16 extends, and the upper end of the shaft may be threaded to take a nut 55, as is conventional. We drill a hole through the hub and through the shaft to take a pin 56, by which the hub and shaft are locked together against relative rotation. An upstanding post 57 has an eye at its upper end which receives the outer extremity of pin 56 and is secured firmly thereto by suitable means such as a tapered pin 58. The post extends downwardly into a position where it may contact one or the other of the projections 51 of the split ring. It will be obvious therefore that as the steering wheel is turned in one direction or the other to steer the vehicle, post 57 will engage one of the projections 51, and make electrical contact therewith and will turn the ring 50 in its groove to the same extent except that some motion of the wheel is possible before the post engages one of the projections 51.

When contact is made between post 57 and one of the projections 51 current flows from the battery through the solenoid coil, conductor 42, fixed ring 44, movable ring 50, post 57, pin 56, steering shaft 46, and back through ground to the battery. The electrical contact is made when post 57 strikes one of the projections 51 and is maintained as long as rotation of the steering wheel is continued in a given direction, affording the desired booster effect. As soon as the driver ceases steering effort or permits the wheel to return to straight ahead position, electrical contact is broken, the supply of power fluid is cut off and any pressure in the booster unit or in conductor 26 is exhausted. When the wheel rights itself, post 57 leaves one projection 51 and moves to the other. Power fluid is cut off while this is occurring, but as soon as post 57 strikes the other projection it comes on again and assists in returning the wheel to the straight ahead position.

It should be understood that the automatic valve herein illustrated and described is not necessarily the only valve in the power line. For example a manual cutoff valve or a measuring valve or both may be included, but such other valves must be located between the automatic valve of this invention and the power source. In other words they must be in the conductor 28 and not in the conductor 26.

The details of the internal construction of one form of booster unit suitable for use in carrying out the invention are illustrated in Figs. 5 and 6 of the drawings. The construction shown is similar to that of our Patent 2,698,006, dated December 28, 1954.

The spool shaped piston at its ends carries packings 59 and 60 which engage the inner wall of the cylinder and seal the space surrounding the constricted middle portion of the piston from the spaces or chambers 61 and 62 within the cylinder outwardly of the piston. 63 is a fluid passage extending entirely through the piston but normally closed at its ends by poppet valves 64 and 65. This passage is always in communication with the live fluid supply through bored passage 66 which connects with the inner end of tube 25. Each of these poppet valves is biased outwardly toward closed position. A slide bar 77 of round cross section is mounted to project through openings in the end portions of the spool shaped piston. This bar is relieved at both ends so that when the bar is in its middle position the intermediate space 79 between the ends of the piston is in communication with the chambers 61 and 62. However when the slide bar is shifted in one direction or the other the unrelieved central portion closes off one or the other of the passages 80 and 81. Screws 82 and 83 in the ends of bar 77 are adapted to bear against levers 86 and 87 which are pivotally mounted intermediate their ends on piston extensions. If the bar 77 is shifted toward the right, screw 83 will tilt lever 87 and move poppet valve 65 to open position. If it is shifted toward the left, lever 86 will open poppet valve 64. Within the space 79 there is an expanding brake band 90, the ends of which may be forced apart by expanding coil springs or other suitable means. This brake band carries strips of brake lining 93 and 94 for engagement with the inner surface of the cylinder. A block 95 is attached to bar 77 midway of its length. Block 95 is received within a slot 97 formed in brake band 90, so that any movement of the band lengthwise of the booster is transmitted to the slide bar 77 and vice versa.

The annular space within the hollow piston rod 22 and tube 25 constitutes an exhaust passage, and this passage is in communication at all times through the ports 102 with the intermediate space 79 which is in communication with one or both of the cylinder chambers 61 and 62.

When the piston is in its normal position illustrated in Fig. 5, the pressure supply is sealed off by the poppet valves 64 and 65 and the cylinder chambers 61 and 62 are exhausted through the passages 80 and 81, the intermediate space 79, ports 102 and the annular passage through the hollow piston rod. When the driver desires to make a turn in a direction calling for the swinging of the pitman 13 toward the left, he turns the steering wheel in the proper direction through a small angle. This pulls cylinder 20 to the left. The brake 90 adheres to the cylinder wall and causes slide bar 77 to move to the left. Screw 82 then contacts lever 86 and moves it clockwise sufficiently to open valve 64, which causes pressure fluid to be discharged into chamber 61. This movement of the slide bar closes the exhaust passage 80 but exhaust passage 81 remains open, thereby preventing any interference with the desired action by pressure which might otherwise be set up in chamber 62. Pressure builds up rapidly in chamber 61 to produce relative movement between the piston and cylinder which exerts the desired booster effect. Operation of the steering wheel to institute a turn in the opposite direction produces an opposite movement of slide bar 77, opening valve 65 through the intermediacy of lever 87 and closing exhaust passage 81, which causes pressure to build up rapidly in chamber 62 while exhaust passage 80 remains open to prevent any build up of pressure in chamber 61.

Normally pressure in the passage 63 is maintained equal to that available in the conductor 26 as controlled by the automatic valve. When the device is idle the automatic valve is of closed and no new pressure fluid enters the booster unit and at this time both of the end chambers 61 and 62 and connected with exhaust. Also any pressure remaining in the tube 25 and passages 66 and 63 will be exhausted through the automatic valve, the piston 30 of which will be in its lowered position.

Having thus described our invention, we claim:

1. In a fluid operated booster, a steering shaft, a cylinder closed at its ends, a piston therein, a piston rod extending through one end of said cylinder, means for connecting the outer ends of the cylinder and piston rod between a relatively fixed element and a movable element to the movement of which the booster effect is to be applied, a fluid power source, a fluid conductor for connecting said power source to one or the other end of said cylinder behind said piston, depending upon the direction in which said shaft is rotated manually, means under control of said steering shaft for exhausting fluid from the opposite end, valve means disposed in said fluid conductor, a solenoid adapted when energized to open said valve means, an electric circuit for said solenoid, switch means comprising one member attached to said shaft and a second member rotatable about the axis of said shaft, in response to movement of said shaft and first member, for maintaining the switch members in contact and the switch closed as long as the shaft is turned and opening the switch and breaking the circuit when the turning of said shaft is discontinued, said shaft being enclosed in a fixed hollow steering column, a metal ring surrounding, attached to and insulated from said column, said ring having a peripheral groove therein, the second named switch member being in the form of a split metal ring snugly mounted in said groove, said circuit comprising a conductor attached to said grooved ring, whereby the circuit remains closed as long as said shaft is being turned with the switch members in contact.

2. A fluid operated booster as defined in claim 1 wherein said split ring has two spaced projections extending into the path of movement of said first switch member, whereby the circuit is closed as soon as said first member is turned in either direction into contact with one of said projections and remains closed as long as said shaft continues to move in that direction.

References Cited in the file of this patent

UNITED STATES PATENTS 2,553,940     Quartullo _____ May 22, 1951

FOREIGN PATENTS 624,978     France _____ July 30, 1927
669,101     Great Britain _____ Mar. 26, 1952